US012559167B2

(12) United States Patent
Jang et al.

(10) Patent No.: US 12,559,167 B2
(45) Date of Patent: Feb. 24, 2026

(54) STEERING CONTROL SYSTEM AND METHOD FOR SAFE DRIVING

(71) Applicant: HL MANDO CORPORATION, Gyeonggi-do (KR)

(72) Inventors: Beomhee Jang, Gyeonggi-do (KR); Jaehoon Bae, Gyeonggi-do (KR); Taesik Kim, Gyeonggi-do (KR); Minsu Seo, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 60 days.

(21) Appl. No.: 18/599,240

(22) Filed: Mar. 8, 2024

(65) Prior Publication Data

US 2024/0359729 A1     Oct. 31, 2024

(30) Foreign Application Priority Data

Apr. 26, 2023    (KR) ......................... 10-2023-0054781
Sep. 26, 2023    (KR) ......................... 10-2023-0129863

(51) Int. Cl.
B62D 5/04 (2006.01)
(52) U.S. Cl.
CPC ......... B62D 5/0493 (2013.01); B62D 5/0484 (2013.01)
(58) Field of Classification Search
CPC ............................ B62D 5/0484; B62D 5/0493
See application file for complete search history.

(56) References Cited

U.S. PATENT DOCUMENTS

| | | | | |
|---|---|---|---|---|
| 2004/0238257 | A1* | 12/2004 | Takahashi ............... | B62D 6/008 |
| | | | | 180/402 |
| 2010/0147618 | A1* | 6/2010 | Osonoi ................... | B62D 5/065 |
| | | | | 180/432 |
| 2018/0043928 | A1* | 2/2018 | Fujita .................... | H02P 29/028 |
| 2018/0178831 | A1* | 6/2018 | Toko ...................... | H02P 27/04 |
| 2019/0100237 | A1* | 4/2019 | Klesing ................. | B62D 5/0484 |
| 2020/0353975 | A1* | 11/2020 | Nakamura ............. | H02P 29/028 |
| 2021/0129855 | A1* | 5/2021 | Nakao ................... | G05B 19/0428 |
| 2021/0387632 | A1* | 12/2021 | Sugawara ............. | B60W 50/023 |
| 2022/0250675 | A1* | 8/2022 | Jeong ................... | H04L 12/40189 |
| 2022/0297743 | A1* | 9/2022 | Sugiyama ............. | B62D 5/0412 |
| 2023/0029564 | A1* | 2/2023 | Satou .................. | G01R 19/16528 |
| 2023/0060008 | A1* | 2/2023 | Williams ................ | B62D 6/00 |
| 2023/0202555 | A1* | 6/2023 | Lee ...................... | B62D 5/0484 |
| | | | | 180/446 |

FOREIGN PATENT DOCUMENTS

| | | |
|---|---|---|
| JP | 2022-38846 | 3/2022 |
| KR | 10-2021-0101857 | 8/2021 |

\* cited by examiner

*Primary Examiner* — Long T Tran
(74) *Attorney, Agent, or Firm* — WOMBLE BOND DICKINSON (US) LLP

(57) ABSTRACT

A steering control system and method for safe driving may control steering of a vehicle by sharing steering control information between control modules of the plurality of steering control devices through a communication channel even when abnormality such as a failure or fault occurs in one or some control modules included in the plurality of steering control devices.

20 Claims, 14 Drawing Sheets first steering control device          second steering control device first steering control device          second steering control device <u>100</u> first steering control device          second steering control device

<u>1400</u> generate first steering control information ~S1410 generate second steering control information ~S1420 share steering control information and control steering motor ~S1430

STEERING CONTROL SYSTEM AND METHOD FOR SAFE DRIVING

CROSS-REFERENCE TO RELATED APPLICATION

This application claims priority to Korean Patent Application Nos. 10-2023-0054781, filed on Apr. 26, 2023, and 10-2023-0129863, filed on Sep. 26, 2023, which are hereby incorporated by reference for all purposes as if fully set forth herein.

BACKGROUND

Field

Some embodiments of the present disclosure generally relate to a steering control system and method for safe driving.

Description of Related Art

Steer-by-wire (SbW) steering systems may remove mechanical/physical linkages, such as universal joint or pinion shaft, between a steering wheel and road wheels, using one or more motors to steer a vehicle.

The SbW steering system controls the steering of the vehicle through electrical signals without mechanical connection elements between the steering wheel and the road wheels. Therefore, a higher level of safety for the SbW steering system may need to be secured. For this reason, the need for a specific design that may secure redundancy of steering control information used to control a vehicle's steering motor is increasing.

BRIEF SUMMARY

According to some embodiments of the present disclosure, there may be provided a steering control system and method for safe driving in which a steering control device generates steering control information and controls a steering control motor based on the generated steering control information.

Further, according to certain embodiments of the present disclosure, there may be provided a steering control system and method for safe driving that may control the steering of a vehicle by sharing steering control information between control modules of the plurality of steering control devices through a communication channel even when a failure occurs in one or some control modules included in the plurality of steering control devices.

In an aspect, according to some embodiments of the present disclosure, a steering control system implemented in a steer by wire (SbW) type may comprise a first steering control device including a first input-side control module generating first steering control information and a first output-side control module controlling a steering motor and a second steering control device including a second input-side control module generating second steering control information and a second output-side control module controlling the steering motor.

The first output-side control module and the second output-side control module may control the steering motor by sharing any one of the first steering control information or the second steering control information. When a failure occurs in the second input-side control module and the first output-side control module, the second output-side control module may control the steering motor based on the first steering control information, and when a failure occurs in the first input-side control module and the second output-side control module, the first output-side control module may control the steering motor based on the second steering control information.

In another aspect, a steering control method performed by a steering control system implemented in a steer by wire (SbW) type may comprise generating first steering control information through a first input-side control module included in a first steering control device, generating second steering control information through a second input-side control module included in a second steering control device, and controlling a steering motor by sharing any one of the first steering control information or the second steering control information by a first output-side control module included in the first steering control device and a second output-side control module included in the second steering control device.

Controlling the steering motor may, when a failure occurs in the second input-side control module and the first output-side control module, control the steering motor based on the first steering control information, through the second output-side control module and, when a failure occurs in the first input-side control module and the second output-side control module, control the steering motor based on the second steering control information, through the first output-side control module.

According to certain embodiments of the present disclosure, there may be provided a steering control system and method that may control a steering motor even when a failure occurs in the steering control module by sharing steering control information through a communication channel between steering control modules.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
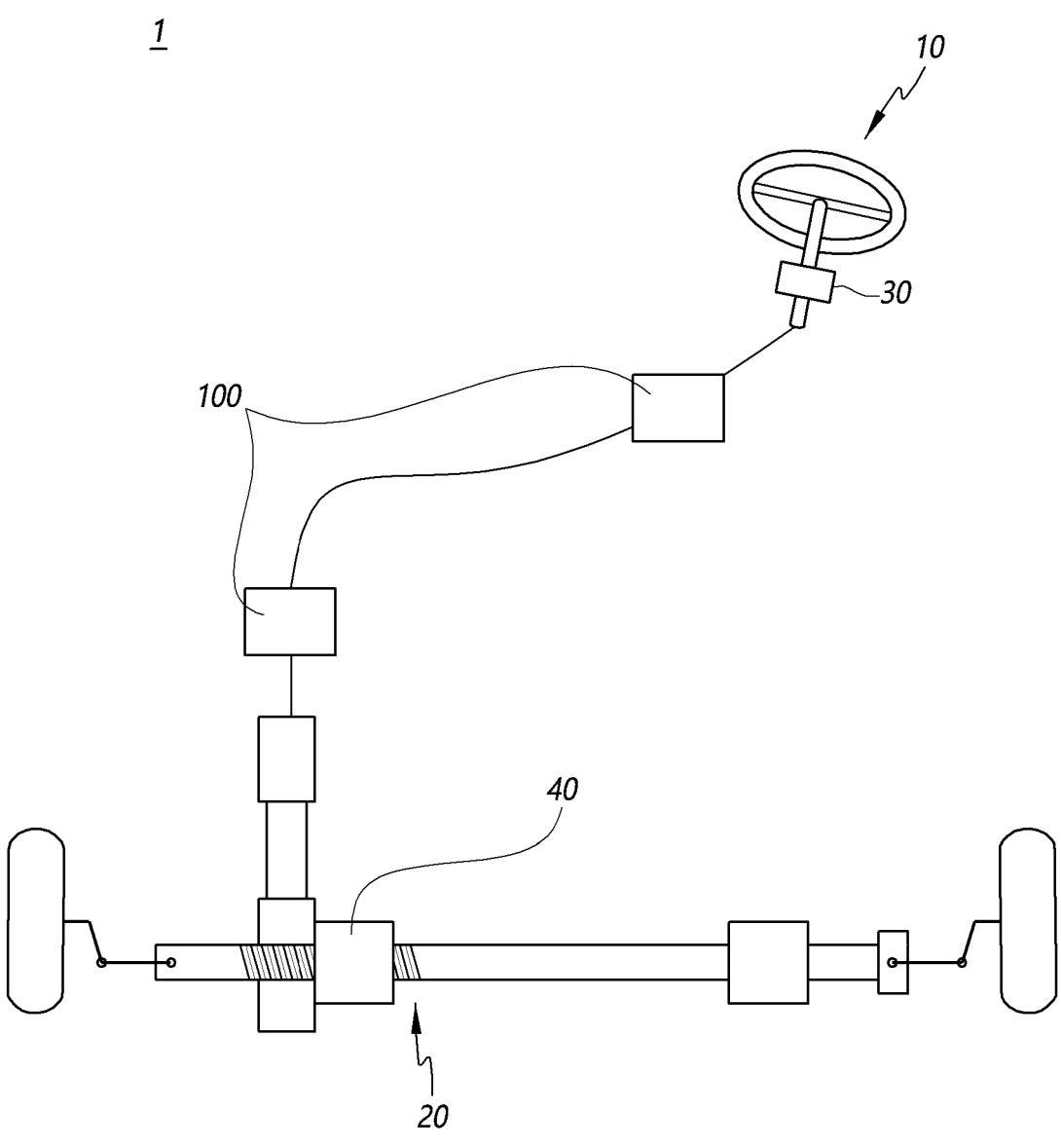
FIG. 1 is a schematic diagram for schematically illustrating a configuration of a steering system according to an embodiment of present disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, a steering control system and method for safe driving according to embodiments of the disclosure is described with reference to the related drawings.

FIG. 1 is a schematic diagram for schematically illustrating a configuration of a steering system according to an embodiment of present disclosure.

A steering system 1 according to an embodiment of the present disclosure illustrated in FIG. 1 may be implemented in a SbW type, and may include a steering feedback actuator (SFA) 10, a steering control system 100, a road wheel actuator (RWA) 20, and the like. When the steering system 1 is implemented as an SbW system, the SFA 10 and the RWA 20 may be mechanically separated or may not be mechanically connected to each other.

The SFA 10 may include, for example, but not limited to, a steering wheel, a steering shaft, and a reaction force motor 30. The SFA 10 may further include a steering gear configured to transfer the rotational force of the reaction force motor 30 to the steering shaft.

The steering wheel may be configured to rotatable between a left steering lock end and a right steering lock end with the steering shaft as a rotation axis. Here, the lock end may refer to a limit point beyond which the steering wheel cannot be rotated.

The reaction force motor 30 may receive a command current from the steering control system 100 and provide a feedback torque to the steering wheel. For example, the reaction force motor 30 may receive a command current from the steering control system 100 and drive at a rotational speed indicated by the command current to generate a feedback torque, and may transfer the feedback torque to the steering wheel through a worm and a worm wheel so that the feedback can be provided to a driver through the steering wheel.

The SFA 10 may include a steering angle sensor detecting a steering angle of the steering wheel or the steering shaft, a torque sensor measuring a torque applied to the steering shaft, and a steering angular velocity sensor detecting a steering angular velocity of the steering wheel or the steering shaft.

The steering control system 100 may receive steering control information from each sensor included in the SFA 10 to calculate a control value, and output an electrical signal indicating the control value to the RWA 20. Here, the steering control information may comprise information including one or more of a steering angle, a steering angular velocity, a steering torque, and any information associated with steering control operations.

Meanwhile, the steering control system 100 may calculate a control value by receiving feedback of power information (e.g., rack position information) actually output from the RWA 20, and output an electrical signal indicating the control value to the SFA 10, thereby providing a sense of steering to the driver. The RWA 20 may refer to a device that actually drives the vehicle to steer or steers the vehicle. For example, the RWA 20 may provide a force for linearly moving a rack bar to turn road wheels. The RWA 20 may include a steering motor 40, a rack bar, one or more wheels, a vehicle velocity sensor, a rack position sensor, and the like.

Each of the SFA 10 and the RWA 20 may further include a motor torque sensor configured to detect the motor torque of the reaction force motor 30 or the steering motor 40.

The steering motor 40 may axially or linearly move the rack bar. Specifically, the steering motor 40 may receive a command current from the steering control system 100 and generate a torque according to the command current, and may allow the rack bar to linearly move in the axial direction. In other words, the rack bar may linearly move between the left lock end, which is the left movement limit point, and the right lock end, which is the right movement limit point.

The rack bar may be linearly moved by the driving of the steering motor 40, and the road wheels may be steered left or right through the linear motion of the rack bar.

Meanwhile, when the steering system 1 is implemented as an SbW system and the vehicle travels in the autonomous driving mode, the steering system 1 may control only the RWA 20 to perform steering control of the vehicle, or control both the SFA 10 and the RWA 20 to perform steering control of the vehicle as well as provide rotary torque to the steering wheel.

Referring back to FIG. 1, the steering system 1 according to an embodiment of the present disclosure may include the steering control system 100, the reaction force motor 30, and the steering motor 40.

The configuration of the steering system 1 illustrated in FIG. 1 is merely an example, and the disclosure is not limited thereto. The steering system according to some embodiments of the present disclosure may further include other components, or one or more components shown in FIG. 1 may be omitted, if necessary. In this case, according to an example, components of the steering system may be combined with each other or some components may be omitted according to vehicle control schemes.

The steering control system 100 may be implemented as at least one of hardware, software, or a combination thereof, such as an electronic control unit (ECU) including one or more of a micro controller unit (MCU), an inverter, a printed circuit board (PCB), or the like.

The steering control system 100 is a device configured to control steering, and may generate steering control information based on signals obtained from the inside and outside of the vehicle. The signals may include, for instance, but not limited to, internal information such as a reaction force motor angle signal, a rackstroke signal, a driving motor angle signal, a torque signal, a steering angle signal, and a yaw rate signal used to control the steering of the vehicle, and detection information associated with the outside or surrounding of the vehicle.

Accordingly, the steering control system 100 may control a steering device, a braking device, and other devices of the vehicle based on the steering control information. The SFA and RWA structures and relationships described above are not limited to specific components as long as the technical spirit of the disclosure may be applied. For example, in the case of a vehicle implemented in an in-wheel motor type, the relationship between the SFA and the in-wheel motor controller configured in each wheel may be configured as the above-described SFA-RWA relationship. In other words, the features of the steering control device described below may apply substantially identically to components configured to have a relationship to which the technical spirit of the disclosure may apply.

Figure 2:
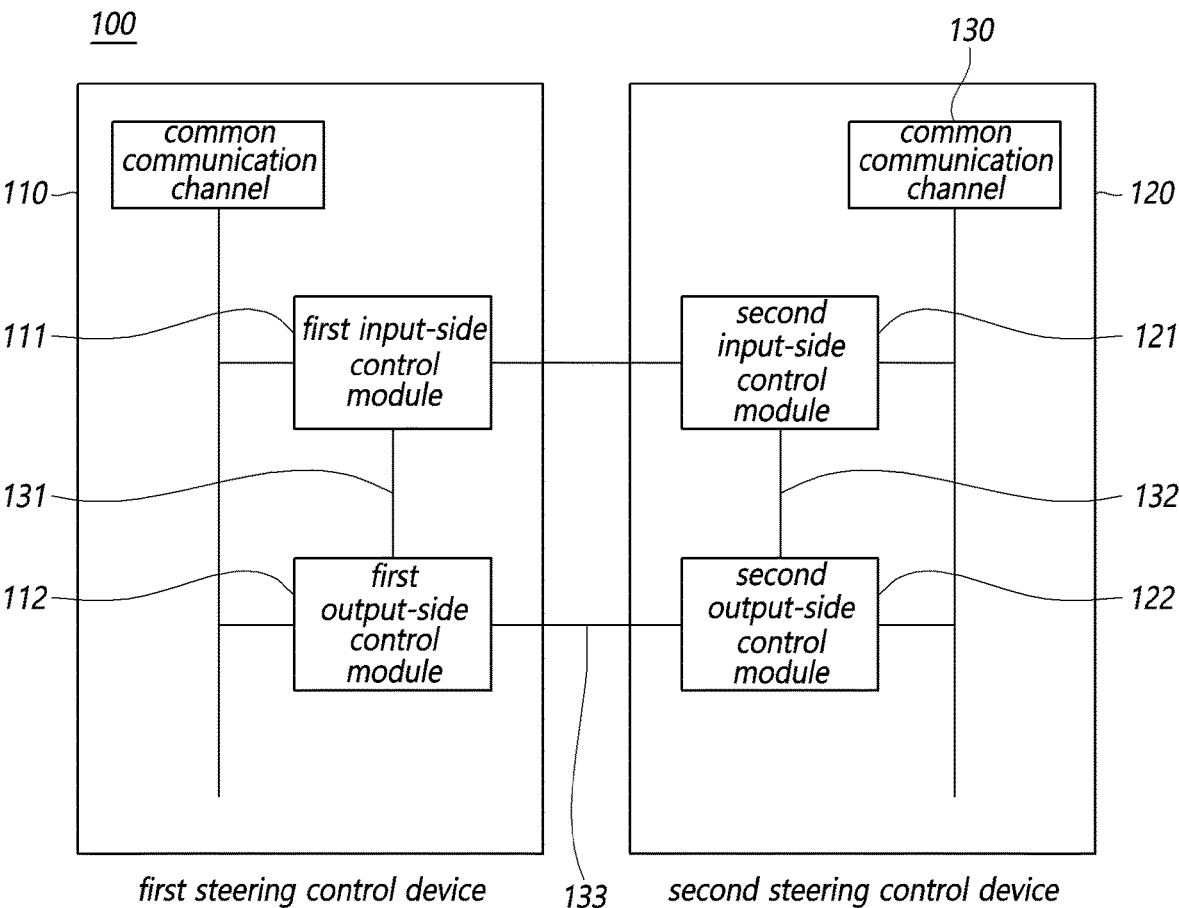
FIG. 2 is a block diagram illustrating a configuration of a steering control device according to an embodiment of the present disclosure.

FIG. 2 is a block diagram illustrating a configuration of a steering control device according to an embodiment of the present disclosure.

Referring to FIG. 2, a steering control system 100 according to an embodiment of the present disclosure may include a first steering control device or a first steering controller 110 and a second steering control device or a second steering controller 120.

The first steering control device 110 may include a first input-side control module 111 for generating first steering control information and a first output-side control module 112 for controlling a steering motor. The second steering control device 120 may include a second input-side control module 121 for generating second steering control information and a second output-side control module 122 for controlling the steering motor.

The first input-side control module 111, the first output-side control module 112, the second input-side control module 121 and the second output-side control module 122 may be implemented as at least one of hardwares such as an electronic control unit (ECU), a micro controller unit (MCU) or the like. However, this is merely an example, and the present disclosure is not limited thereto.

According to an example, the steering control system 100 may be configured to be redundant so that when detecting abnormality such as a failure or fault of the first steering control device 110, the first input-side control module 111 transfers the control right to the second input-side control module 121 or, when detecting abnormality such as a failure or fault of the second steering control device 120, the second input-side control module 121 transfers the control right to the first input-side control module 111. In this case, the first input-side control module 111 and the second input-side control module 121 may be configured in a master-slave relationship to generate steering control information. For example, when the first input-side control module 111 does not operate normally or is in an abnormal state, the second input-side control module 121 may generate steering control information. Here, the steering control information generated by the first input-side control module 111 and the second input-side control module 121 may be identical. In other words, the first steering control information and the second steering control information may be the same. However, this is merely an example, and the present disclosure is not limited thereto. The abnormal state may include, for instance, but not limited to, a failure state which is termination of an intended operation of an element or an item due to a fault manifestation or a fault state which is an abnormal condition that can cause an element or an item to fail. The relationship between the first input-side control module 111 and the second input-side control module 121 may be variously configured as necessary, unless it contradicts the technical spirit of the disclosure.

Likewise, the steering control system 100 may be configured to be redundant so that when detecting abnormality such as a failure or fault of the first steering control device 110, the first output-side control module 112 transfers the control right to the second output-side control module 122 or, when detecting abnormality such as a failure or fault of the second steering control device 120, the second output-side control module 122 transfers the control right to the first output-side control module 112. In this case, the first output-side control module 112 and the second output-side control module 122 may be configured in a master-slave relationship to control the steering motor based on the steering control information. However, this is merely an example, the present disclosure is not limited thereto. The relationship between the first output-side control module 112 and the second output-side control module 122 may be variously configured as necessary, unless it contradicts the technical spirit of the disclosure.

Referring back to FIG. 2, the first output-side control module 112 and the second output-side control module 122 may share steering control information to control the steering motor based on any one of the first steering control information or the second control information. The first output-side control module 112 may receive any one of the first steering control information or the second steering control information from any one of the first input-side control module 111 or the second input-side control module 121. Thereafter, the first output-side control module 112 may transmit any one of the first steering control information or the second steering control information to the second output-side control module 122 through a communication channel 133 connected to the second output-side control module 122. Similarly, the second output-side control module 122 may receive any one of the first steering control information or the second steering control information from any one of the first input-side control module 111 or the second input-side control module 121. Thereafter, the second output-side control module 122 may transmit any one of the first steering control information or the second steering control information to the first output-side control module 112 through the communication channel 133 connected to the first output-side control module 112.

Here, the communication channel may be a communication path for sharing the steering control information, and may include, for example, but not limited to, a control area network (CAN), which is a common communication channel for a vehicle capable of communicating with modules mounted on or included in a vehicle, an inter micro CAN (IMC) or a private CAN (control area network) connected between two control modules. The common communication channel may be configured for communication between modules included in the steering control system 100 as well communication with modules of the vehicle not included in the steering control system 100. However, the internal communication channel may be configured for internal communication between modules included in the steering control system 100, for example, communication between two or more of the first input-side control module 111, the first output-side control module 112, the second input-side control module 121, the second output-side control module 122.

After receiving the first steering control information from the first input-side control module 111 through the internal communication channel 131, the first output-side control module 112 may share the first steering control information with the second output-side control module 122. Further, when the first input-side control module 111 does not operate normally or is in an abnormal state, the second output-side control module 122 may receive the second steering control information from the second input-side control module 121 through the internal communication channel 132, and then share the second steering control information with the first output-side control module 112. Accordingly, even when abnormality such as a failure or fault occurs in any one of the first input-side control module 111 or the second input-side module 121, the steering control device may normally control the steering motor by sharing the steering control information through the communication channels 131 and 132.

For example, when abnormality such as a failure or fault occurs in the first input-side control module 111, the second output-side control module 122 may receive the second steering control information from the second input-side control module 121 through the internal communication channel 132 and share the second steering control information with the first output-side control module 112 through the communication channel 133. Accordingly, the first output-side control module 112 and the second output-side control module 122 may normally control the steering motor based on the second steering control information.

As another example, when abnormality such as a failure or fault occurs in the second input-side control module 121, the first output-side control module 112 may receive the first steering control information from the first input-side control module 111 through the internal communication channel 131 and share the first steering control information with the second output-side control module 122 through the communication channel 133. Therefore, the first output-side control module 112 and the second output-side control module 122 may normally control the steering motor based on the first steering control information.

Further, the steering control device may control the steering motor at a performance up to 50% even when abnormality such as a failure or fault occurs in any one of the first output-side control module 112 or the second output-side control module 122. For example, the steering motor 40 may be a dual winding motor. In this case, the first output-side control module 112 and the second output-side control module 122 each may control the steering motor at a performance up to 50%.

For example, when abnormality such as a failure or fault occurs in the first output-side control module 112, the second output-side control module 122 may receive the second steering control information from the second input-side control module 121 through the internal communication channel 132 and control the steering motor at a performance up to 50%. Similarly, when abnormality such as a failure or fault occurs in the second output-side control module 122, the first output-side control module 112 may receive the first steering control information from the first input-side control module 111 through the internal communication channel 131 to control the steering motor at a performance up to 50%.

As another example, when abnormality such as a failure or fault occurs in the first steering control device 110 (e.g. the first input-side control module 111 and the first output-side control module 112), the second output-side control module 122 may receive the second steering control information from the second input-side control module 121 through the internal communication channel 132 to control the steering motor at a performance up to 50%. Similarly, when abnormality such as a failure or fault occurs in the second steering control device 120 (e.g. the second input-side control module 121 and the second output-side control module 122), the first output-side control module 112 may receive the first steering control information from the second input-side control module 121 through the internal communication channel 131 to control the steering motor at a performance up to 50%.

As another example, when abnormality such as a failure or fault occurs in the second input-side control module 121 and the first output-side control module 112, the second output-side control module 122 may receive the first steering control information from the first input-side control module 111 and then control the steering motor based on the first steering control information.

As another example, when abnormality such as a failure or fault occurs in the first input-side control module 111 and the second output-side control module 122, the first output-side control module 112 may receive the second steering control information from the second input-side control module 121 and then control the steering motor based on the second steering control information.

When abnormality such as a failure or fault occurs in the control module, the steering control system 100 may generate steering control information for performing operations such as Limp Aside and Stop in Place. Thereafter, the steering control system 100 may send a notification about a control module abnormality such as a system failure or fault to the driver. According to an example, the notification of the failure or fault in the control module may include a warning using an output interface of an in-vehicle display, a speaker, a haptic module, or the like. Alternatively, the notification of the failure or fault in the control module may include a message transmitted to a personal communication device of the driver communicatively connected to the vehicle or an external server related to control module management.

Accordingly, there may be provided a steering control system for safe driving capable of controlling steering by sharing steering control information through communication channels 131, 132, and 133 between control modules, such as the first input-side control module 111, the second input-side control module 121, the second input-side control module 112, and the second output-side control module 122, even when abnormality such as a failure or fault occurs in one or some control modules.

Hereinafter, a communication channel connection structure between control modules capable of controlling steering by sharing steering control information even when abnormality such as a failure or fault occurs in one or some control modules is described in detail with reference to the related drawings.

Figure 3:
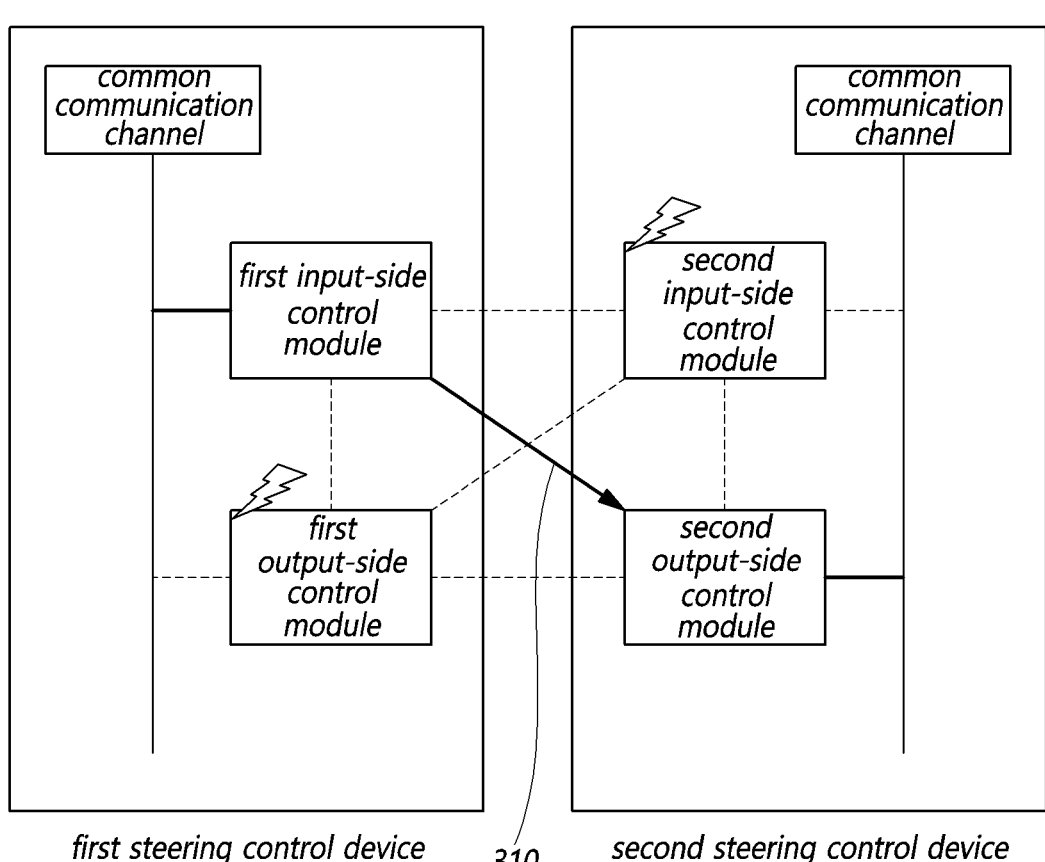
FIGS. 3 and 4 are views illustrating controlling steering using an additional internal communication channel between control modules according to an embodiment of the present disclosure.
Figure 4:
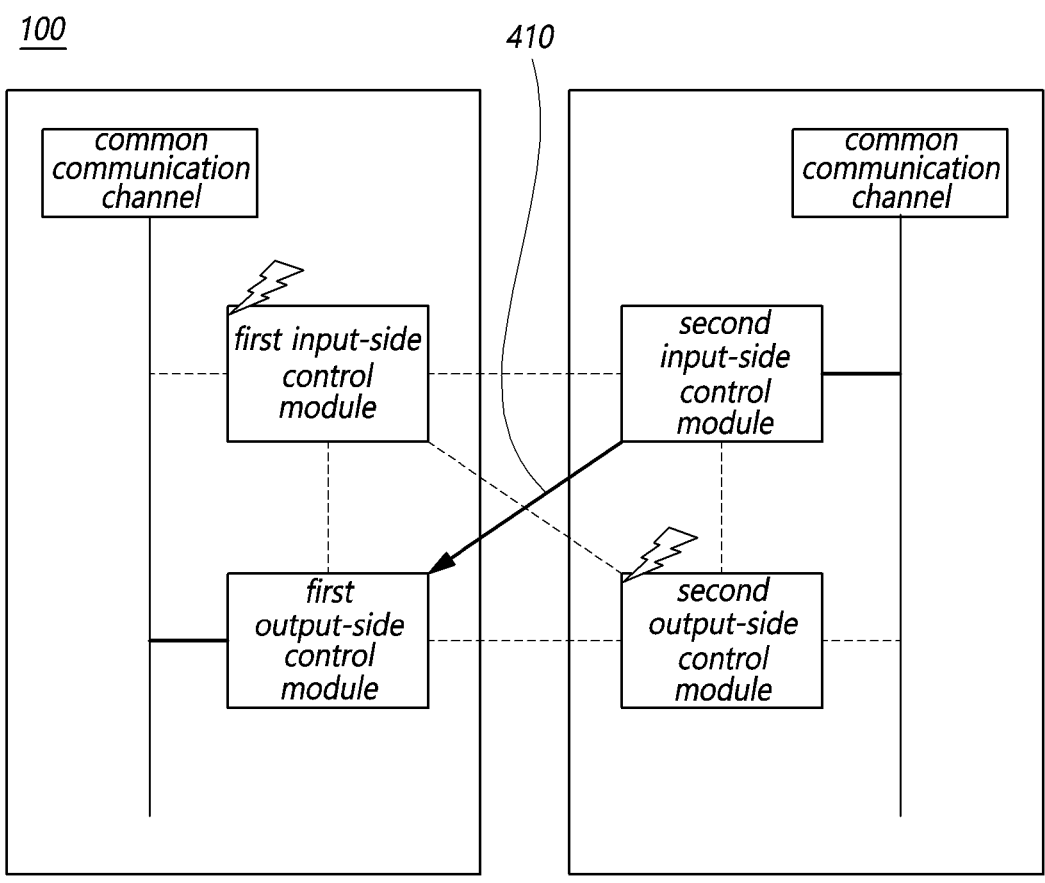

FIGS. 3 and 4 are views illustrating controlling steering using an additional internal communication channel between control modules according to an embodiment of the present disclosure.

Referring to FIGS. 3 and 4, the first input-side control module 111 and the second input-side control module 121 may be additionally connected to the first output-side control module 112 and the second output-side control module 122 through the internal communication channel 310 or 410. In other words, the first input-side control module 111 may be directly connected to the first output-side control module 112 through the internal communication channel 131 and the second output-side control module 122 through the internal communication channel 310. Similarly, the second input-side control module 121 may be directly connected to the first output-side control module 112 through the internal communication channel 132 and the second output-side control module 122 through the internal communication channel 410.

Accordingly, the first input-side control module 111 may transmit the first steering control information to the first output-side control module 112 through the internal communication channel 131. The first input-side control module 111 may transmit the first steering control information to the second output-side control module 122 through the internal communication channel 310. Further, the second input-side control module 121 may transmit the second steering control information to the first output-side control module 112 through the internal communication channel 410. The second input-side control module 121 may transmit second steering control information to the second output-side control module 122 through the internal communication channel 132.

According to an example, when abnormality such as a failure or fault occurs in the second input-side control module 121 and the first output-side control module 112, the second output-side control module 122 may receive the first steering control information from the first input-side control module 111 through the internal communication channel 310 to control the steering motor. In other words, as illustrated in FIG. 3, when abnormality such as a failure or fault occurs in the first output-side control module 112, the second output-side control module 122 may not be allowed to share the first steering control information from the first output-side control module 112 or the second output-side control module 122 cannot receive the first steering control information from the first output-side control module 112. In this case, the second output-side control module 122 may directly receive the first steering control information from the first input-side control module 111 through the additionally connected internal communication channel 310.

Further, when abnormality such as a failure or fault occurs in the first input-side control module 111 and the second output-side control module 122, the first output-side control module 112 may receive the second steering control information from the second input-side control module 121 through the internal communication channel 410 to control the steering motor. In other words, as illustrated in FIG. 4, when abnormality such as a failure or fault occurs in the first input-side control module 111, the second steering control information may be generated in the second input-side control module 121. As described above, when the second output-side control module 122 is normal, the first output-side control module 112 may control the steering motor by allowing the second steering control information to be shared by the second output-side control module 122 or receiving the second steering control information from the second output-side control module 122. Alternatively, when abnormality such as a failure or fault occurs in the second output-side control module 122, the first output-side control module 112 may not be allowed to share the second steering control information from the second output-side control module 122 or may not receive the second steering control information from the second output-side control module 122. In this case, the first output-side control module 112 may directly receive the second steering control information from the second input-side control module 121 through the additionally connected internal communication channel 410.

Accordingly, even when abnormality such as a failure or fault occurs in one or some control modules, the first input-side control module 111 and the second input-side control module 121 may share steering control information through connection with the first input-side control module 111 and the second input-side control module 121 through the internal communication channel 310 or 410, thereby providing a steering control system for safe driving capable of controlling steering.

Figure 5:
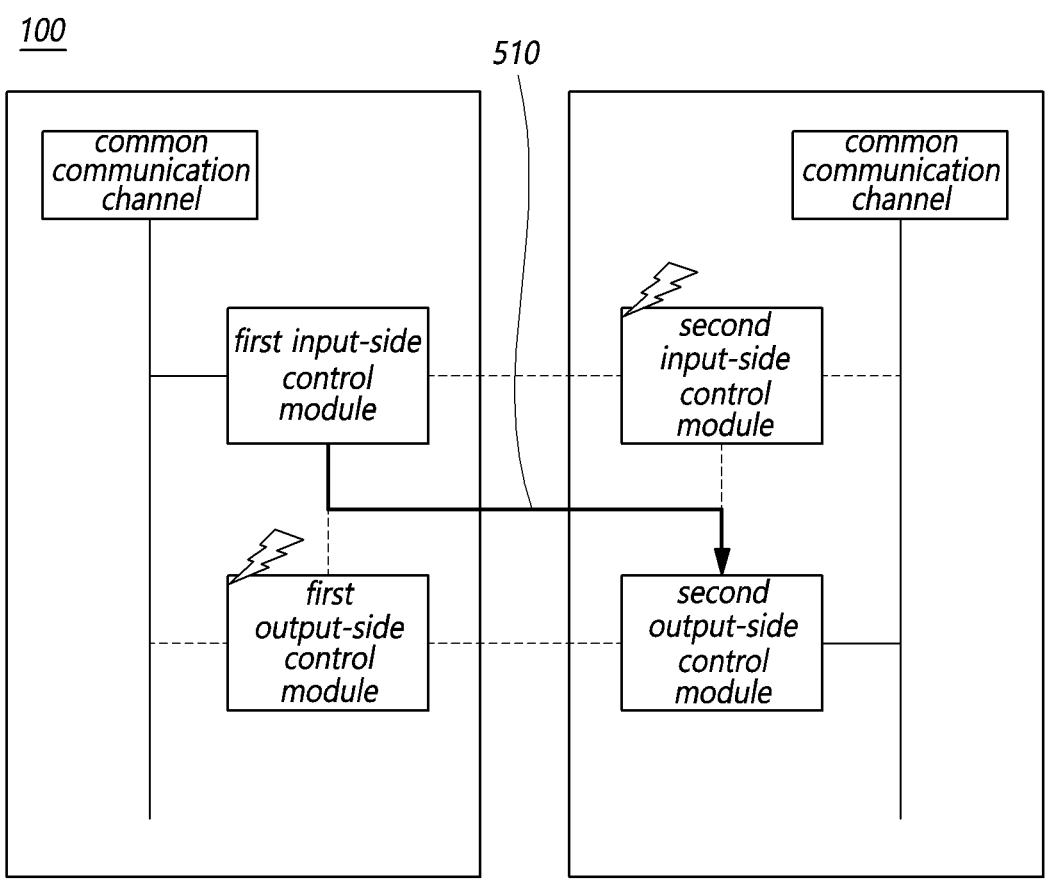
FIGS. 5 and 6 are views illustrating controlling steering using an integrated internal communication channel between control modules according to an embodiment of the present disclosure.
Figure 6:
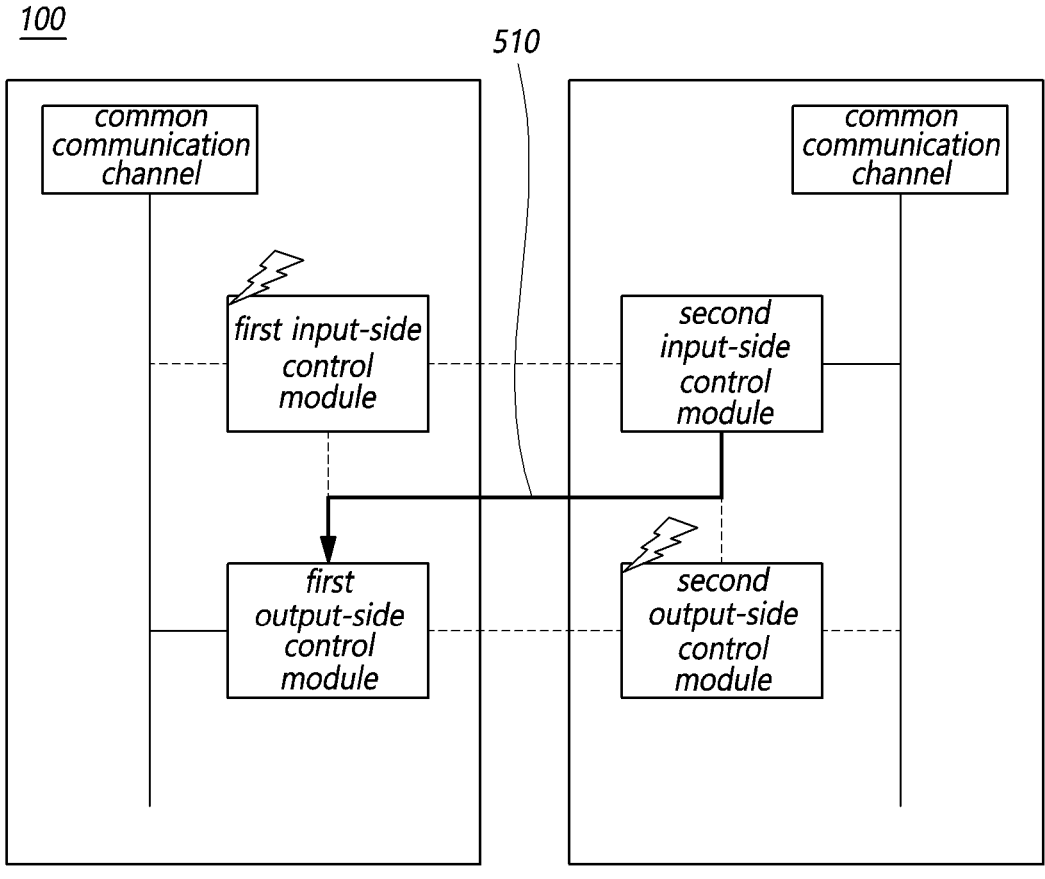

FIGS. 5 and 6 are views illustrating controlling steering using an integrated internal communication channel between control modules according to an embodiment of the present disclosure.

Referring to FIGS. 5 and 6, the first input-side control module 111, the second input-side control module 121, the first output-side control module 112, and the second output-side control module 122 may be additionally connected to one integrated internal communication channel 510.

The first input-side control module 111 may transmit the first steering control information to the first output-side control module 112 and the second output-side control module 122 through the internal communication channel 510. The second input-side control module 121 may transmit the second steering control information to the first output-side control module 112 and the second output-side control module 122 through the internal communication channel 510.

For example, the internal communication channel 510 may be an integrated CAN BUS that connects the first input-side control module 111, the second input-side control module 121, the first output-side control module 112, and the second output-side control module 122 to one integrated communication channel. The CAN BUS may communicate using one of, for instance, but not limited to, an optical fiber or a twisted two-wire medium. In this case, the transmission of signals through the internal communication channel 510 may be configured such that the signal transmission from the first input-side control module 111 and the signal transmission from the second input-side control module 121 are temporally divided and performed with, for instance, but not limited to, a time division duplex method. For example, while the signal transmission through the internal communication channel 510 is performed by the first input-side control module 111, the signal transmission through the internal communication channel 510 by the second input-side control module 121 may be withheld or may not be performed. And, while the signal transmission through the internal communication channel 510 is performed by the second input-side control module 121, the signal transmission through the internal communication channel 510 by the first input-side control module 111 may not be performed.

According to an example, when abnormality such as a failure or fault occurs in the second input-side control module 121 and the first output-side control module 112, the second output-side control module 122 may receive the first steering control information from the first input-side control module 111 through one integrated internal communication channel 510 to control the steering motor. In other words, as illustrated in FIG. 5, when abnormality such as a failure or fault occurs in the first output-side control module 112, the second output-side control module 122 may not be allowed to share the first steering control information from the first output-side control module 112 or may be unable to receive the first steering control information from the first output-side control module 112. In this case, the second output-side control module 122 may directly receive the first steering control information from the first input-side control module 111 through the additionally connected internal communication channel 510.

Further, when abnormality such as a failure or fault occurs in the first input-side control module 111 and the second output-side control module 122, the first output-side control module 112 may receive the second steering control information from the second input-side control module 121 through one integrated internal communication channel 510 to control the steering motor. In other words, as illustrated in FIG. 6, when abnormality such as a failure or fault occurs in the first input-side control module 111, the second steering control information may be generated in the second input-side control module 121. As described above, when the second output-side control module 122 is normal, the first output-side control module 112 may control the steering motor by allowing the second steering control information to be shared by the second output-side control module 122. Alternatively, when abnormality such as a failure or fault occurs in the second output-side control module 122, the first output-side control module 112 may not be allowed to share the second steering control information from the second output-side control module 122 or may not receive the second steering control information from the second output-side control module 122. In this case, the first output-side control module 112 may directly receive the second steering control information from the second input-side control module 121 through the additionally connected internal communication channel 510.

Accordingly, there may be provided a steering control system for safe driving capable of controlling steering by sharing steering control information through one integrated communication channel 510 between control modules even when abnormality such as a failure or fault occurs in one or some control modules.

Figure 7:
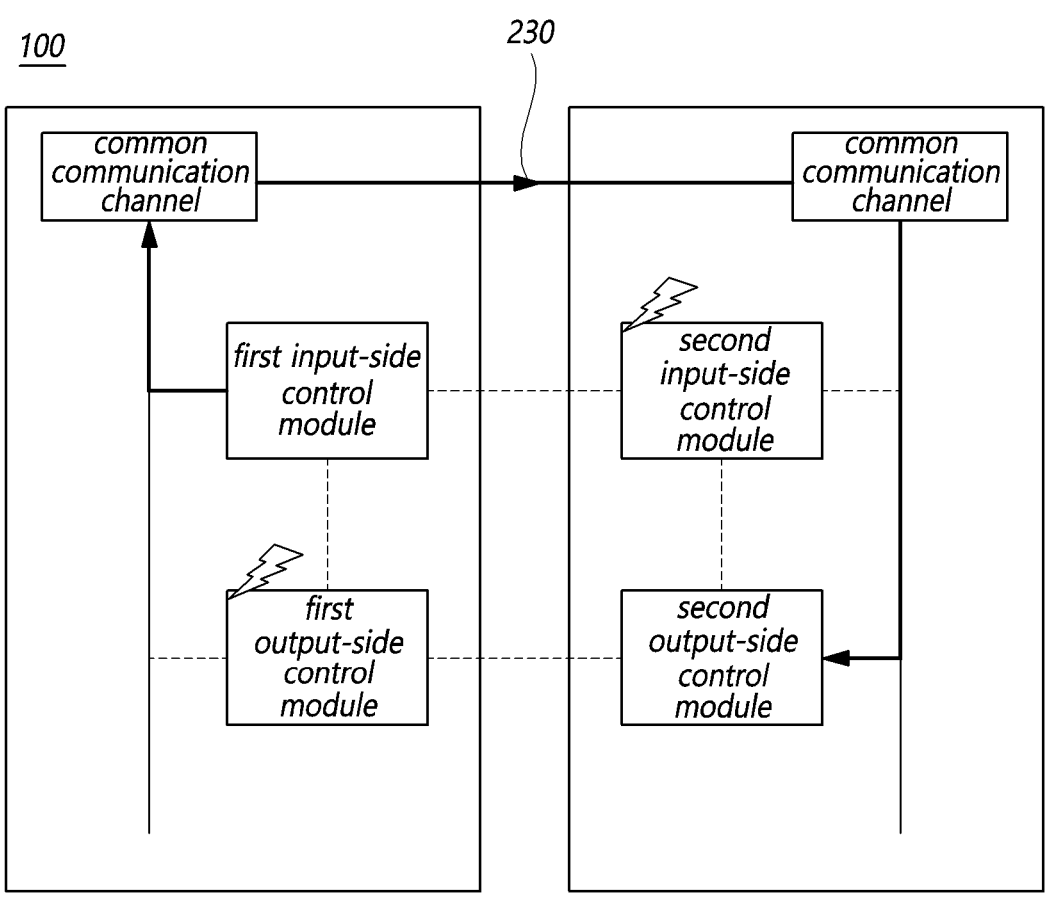
FIGS. 7 and 8 are views illustrating controlling steering using a common communication channel between control modules according to an embodiment of the present disclosure.
Figure 8:
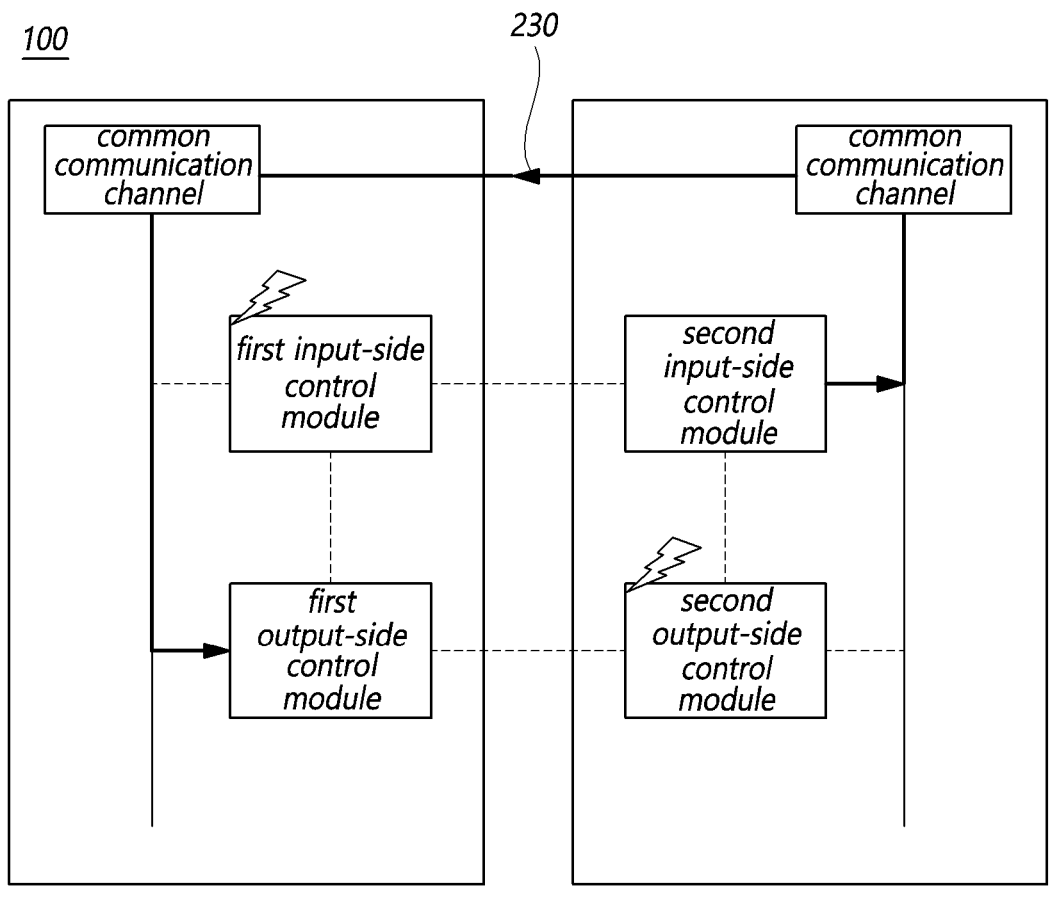

FIGS. 7 and 8 are views illustrating controlling steering using a common communication channel between control modules according to an embodiment of the present disclosure.

As described above, in the normal state of the steering control system 100, the first input-side control module 111 may transmit the first steering control information to the first output-side control module 112 through the internal communication channel 131. And, the second input-side control module 121 may transmit second steering control information to the second output-side control module 122 through the internal communication channel 132.

If the steering control information may not be transmitted through the internal communication channel 131 or 132, as illustrated in FIGS. 7 and 8, the first output-side control module 112 and the second output-side control module 122 may be configured to receive the first steering control information or the second steering control information through the common communication channel 230. Specifically, the first output-side control module 112 may be able to receive the second steering control information from the second input-side control module 121 through the common communication channel 230, and the second output-side control module 122 may be able to receive the first steering control information from the first input-side control module 111 through the common communication channel 230.

According to an example, when abnormality such as a failure or fault occurs in the second input-side control module 121 and the first output-side control module 112, the second output-side control module 122 may receive the first steering control information from the first input-side control module 111 through the common communication channel 230 to control the steering motor. In other words, as illustrated in FIG. 7, when abnormality such as a failure or fault occurs in the first output-side control module 112, the second output-side control module 122 may not be allowed to share the first steering control information from the first output-side control module 112 or may not receive the first steering control information from the first output-side control module 112. In this case, the second output-side control module 122 may receive the first steering control information from the first input-side control module 111 through the common communication channel 230.

Further, when abnormality such as a failure or fault occurs in the first input-side control module 111 and the second output-side control module 122, the first output-side control module 112 may receive the second steering control information from the second input-side control module 121 through the common communication channel 230 to control the steering motor. In other words, as illustrated in FIG. 8, when abnormality such as a failure or fault occurs in the first input-side control module 111, the second steering control information may be generated in or by the second input-side control module 121. As described above, when the second output-side control module 122 is normal, the first output-side control module 112 may control the steering motor by allowing the second steering control information to be shared by the second output-side control module 122. And, when abnormality such as a failure or fault occurs in the second output-side control module 122, the first output-side control module 112 may not be allowed to share the second steering control information from the second output-side control module 122 or may not receive the second steering control information from the second output-side control module 122. In this case, the first output-side control module 112 may receive the second steering control information from the second input-side control module 121 through the common communication channel 230.

Accordingly, there may be provided a steering control system for safe driving capable of controlling steering by sharing steering control information through the internal communication channel 131 or 132 and the common communication channel 230 between control modules even when abnormality such as a failure or fault occurs in one or some control modules.

FIGS. 9 to 13 are views illustrating controlling steering using an internal communication channel connection structure in which an input-side control module of a steering control device is connected with an output-side control module of another steering control device according to an embodiment of the present disclosure.

Figure 9:
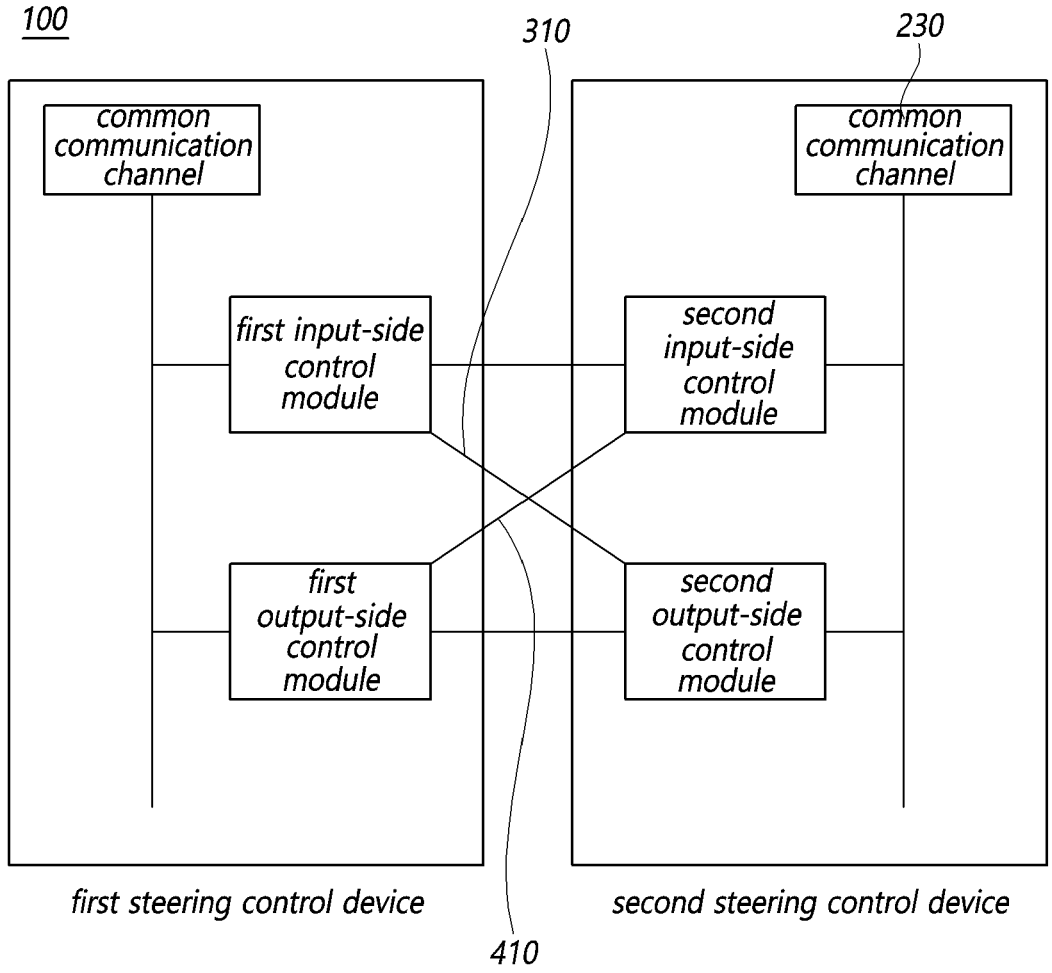
FIGS. 9 to 13 are views illustrating controlling steering using an internal communication channel connection structure in which an input-side control module of a steering control device is connected with an output-side control module of another steering control device according to an embodiment of the present disclosure.

Referring to FIG. 9, the first input-side control module 111 may be connected to the second output-side control module 122 through the internal communication channel 310, and the second input-side control module 121 may be connected to the first output-side control module 112 through the internal communication channel 410. In other words, as compared to the embodiment of FIG. 2, the present embodiment may not have the internal communication channel 131 or 132.

According to the present disclosure, the first input-side control module 111 may transmit the first steering control information to the second output-side control module 122 through the internal communication channel 310. Thereafter, the second output-side control module 122 may share the first steering control information with the first output-side control module 112 or transmit the first steering control information to the first output-side control module 112. Further, the second input-side control module 121 may transmit the second steering control information to the first output-side control module 112 through the internal communication channel 410. Thereafter, the first output-side control module 112 may share the first steering control information with the second output-side control module 121 or may transmit the first steering control information to the second output-side control module 121.

Hereinafter, embodiments of FIGS. 10 to 13 may be implemented in the structure described with reference to FIG. 9.

Figure 10:
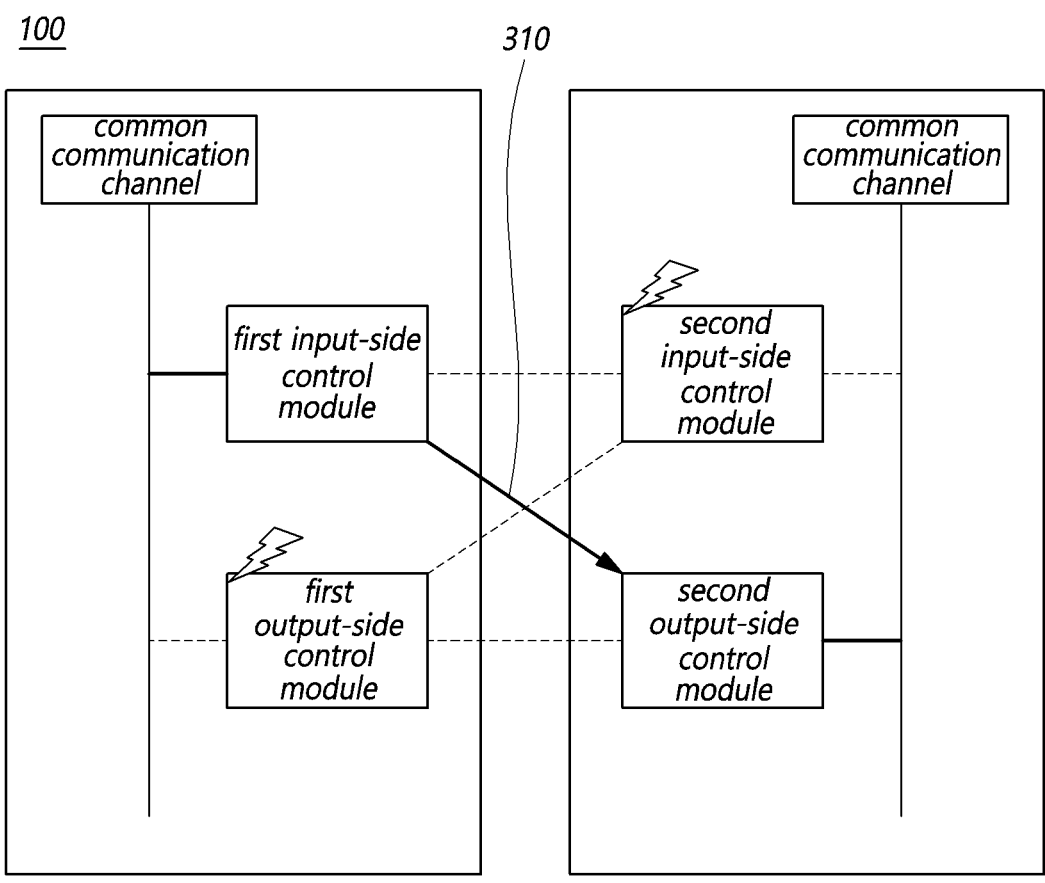

According to an example, after receiving the first steering control information from the first input-side control module 111 through the internal communication channel 310, the second output-side control module 122 may control the steering motor by sharing the first steering control information with the first output-side control module 112. As illustrated in FIG. 10, when abnormality such as a failure or fault occurs in the first output-side control module 112, the second output-side control module 122 may not share the first steering control information with the first output-side control module 112. Even in this case, the second output-side control module 122 may control the steering motor based on the first steering control information received from the first input-side control module 111.

Figure 11:
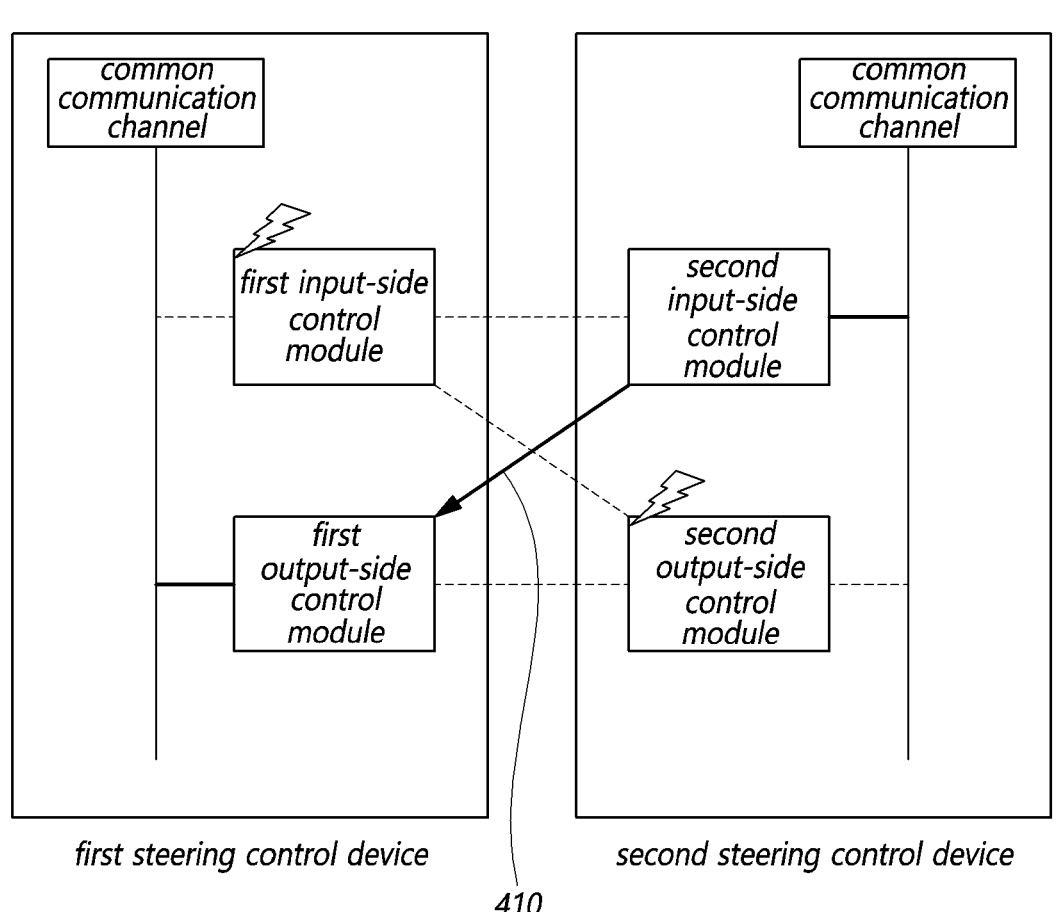

Further, when abnormality such as a failure or fault occurs in the first input-side control module 111, the first output-side control module 112 may receive the second steering control information from the second input-side control module 121 through the internal communication channel 410, and then share the second steering control information with the second output-side control module 122 to control the steering motor. As illustrated in FIG. 11, when abnormality such as a failure or fault occurs in the second output-side control module 122, the first output-side control module 112 may not share the second steering control information with the second output-side control module 122. Even in this case, the first output-side control module 112 may control the steering motor based on the second steering control information received from the second input-side control module 121.

Figure 12:
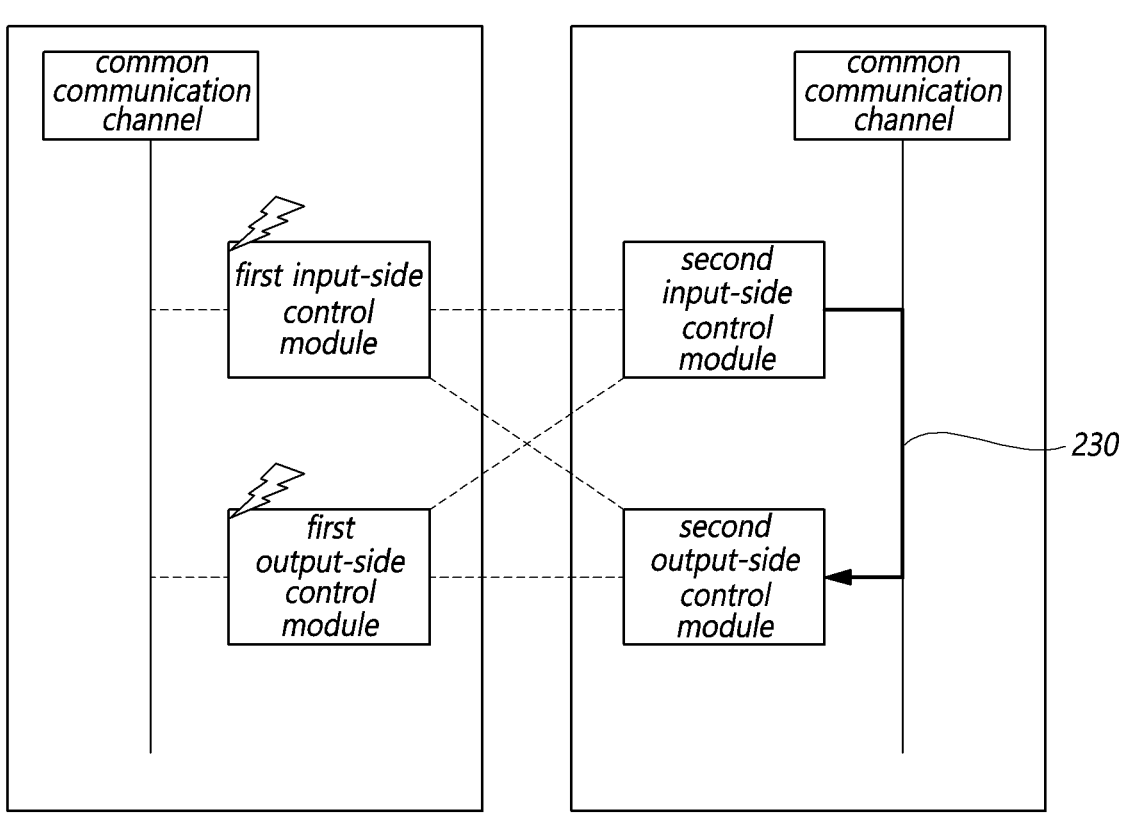
Figure 13:
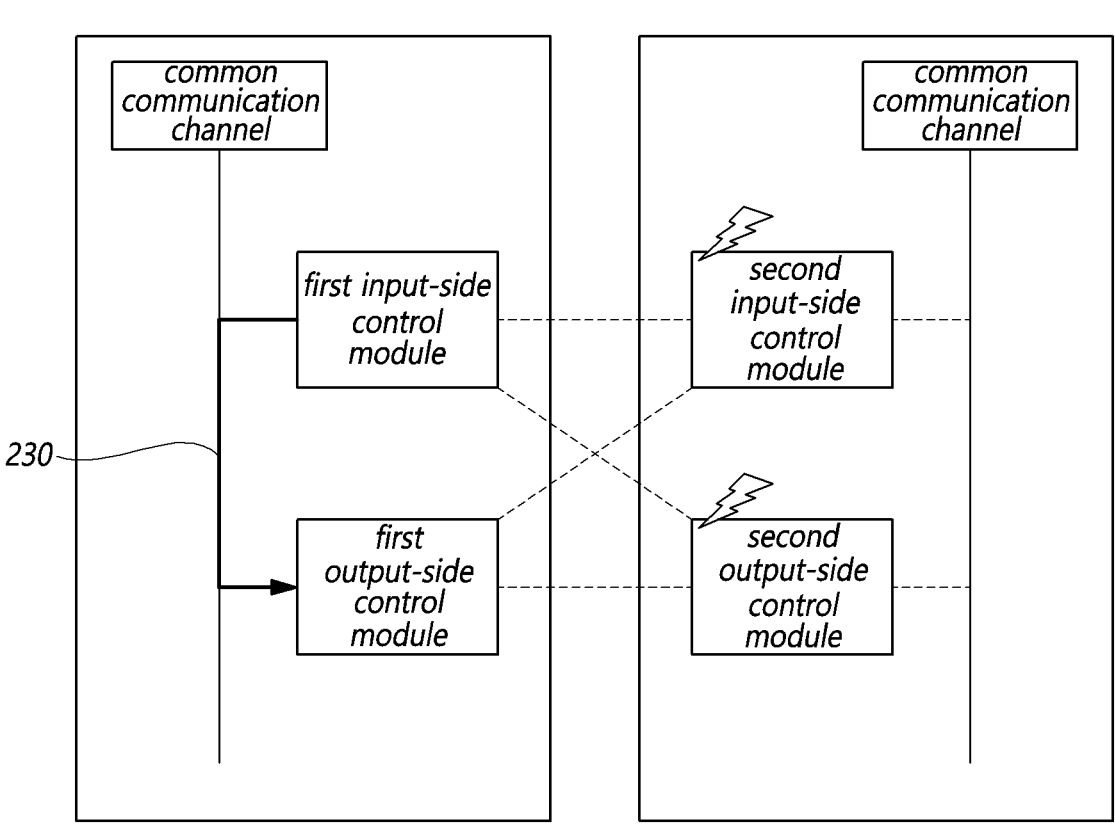

FIG. 12 illustrates an exemplary case that abnormality such as a failure or fault occurs in the first input-side control module 111 and the first output-side control module 112 of the first steering control device 110, and FIG. 13 illustrates another exemplary case that abnormality such as a failure or fault occurs in the second input-side control module 121 and the second output-side control module 122 of the second steering control device 120. In the exemplary case of FIG. 13, the first input-side control module 111 and the first output-side control module 112 may share steering information through the common communication channel 230. In the exemplary case of FIG. 12, the second input-side control module 121 and the second output-side control module 122 may share steering information through the common communication channel 230.

In the exemplary case of FIG. 12, when abnormality such as a failure or fault occurs in the first steering control device 110 (e.g. the abnormality in the first input-side control module 111 and the first output-side control module 112), the second output-side control module 122 may receive the second steering control information from the second input-side control module 121 through the common communication channel 230 to control the steering motor. As illustrated in FIG. 12, when abnormality such as a failure or fault occurs in the first steering control device 110, the second output-side control module 122 may not receive the first steering control information from the first input-side control module 111. In this case, the second output-side control module 122 may receive the second steering control information from the second input-side control module 121 through the common communication channel 230.

In the exemplary case of FIG. 13, when abnormality such as a failure or fault occurs in the second steering control device 120 (e.g. the abnormality in the second input-side control module 121 and the second output-side control module 122), the first output-side control module 112 may receive the first steering control information from the first input-side control module 111 through the common communication channel 230 to control the steering motor. As illustrated in FIG. 13, when abnormality such as a failure or fault occurs in the second steering control device 120, the first output-side control module 112 may not receive the second steering control information from the second input-side control module 121. In this case, the first output-side control module 112 may receive the first steering control information from the first input-side control module 111 through the common communication channel 230.

Accordingly, there may be provided a steering control system for safe driving capable of controlling steering by sharing steering control information through the internal communication channel 310 or 410 and the common communication channel 230 between control modules even when abnormality such as a failure or fault occurs in one or some control module.

Hereinafter, some embodiments of a steering control method may be performed in the embodiments of the steering control system described with reference to FIGS. 1 to 13. The above-described description may be omitted to avoid redundant description and, in that case, the omitted content may be applied in substantially the same or similar manner to the following description as long as it does not go against the technical spirit of the disclosure.

Figure 14:
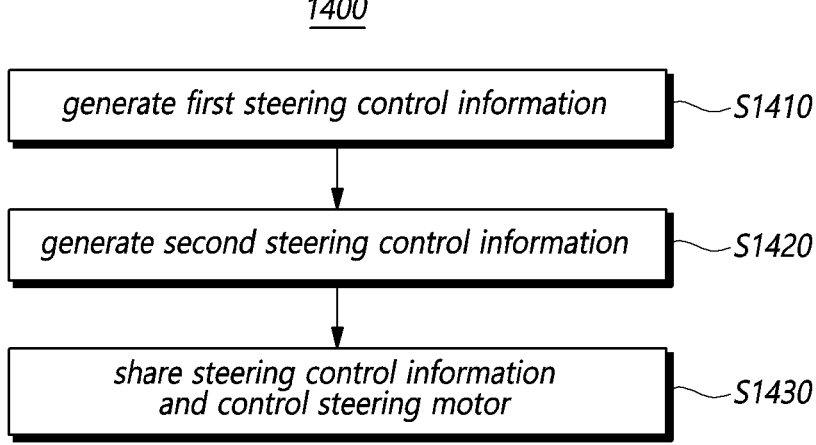
FIG. 14 is a flowchart illustrating a steering control method according to an embodiment of the present disclosure.

FIG. 14 is a flowchart illustrating a steering control method according to an embodiment of the present disclosure.

Referring to FIG. 14, a first input-side control module may generate first steering control information (step S1410), and a second input-side control module may generate second steering control information (step S1420).

A steering control system which is configured to perform the steering control method may include a first steering control device and a second steering control device. The first steering control device may include a first input-side control module configured to generate the first steering control information and a first output-side control module configured to control a steering motor. The second steering control device may include a second input-side control module configured to generate the second steering control information and a second output-side control module configured to control the steering motor.

According to an example, the first input-side control module and the second input-side control module may be configured to be redundant. Accordingly, either one of the first input-side control module and the second input-side control module is capable of being sufficient to perform a required function or represent information. In this case, the first input-side control module and the second input-side control module may be configured in a master-slave relationship to generate steering control information. For example, when the first input-side control module does not operate normally or operates in an abnormal state, the second input-side control module may generate steering control information. The abnormal state may include, for instance, but not limited to, a failure state which is termination of an intended operation of an element or an item due to a fault manifestation or a fault state which is an abnormal condition that can cause an element or an Item to fail. However, this is merely an example, and the present disclosure is not limited thereto. The relationship between the first Input-side control module and the second input-side control module may be variously configured as necessary, unless it contradicts the technical spirit of the disclosure.

Likewise, the first output-side control module and the second output-side control module may be configured to be redundant. Accordingly, either one of the first output-side control module and the second output-side control module is capable of being sufficient to perform a required function or represent information. In this case, the first output-side control module and the second output-side control module may be configured in a master-slave relationship to control the steering motor based on the steering control information such as the first steering control information and the second steering control information. However, this is merely an example, and the present disclosure is not limited thereto. The relationship between the first output-side control module and the second output-side control module may be variously configured as necessary, unless it contradicts the technical spirit of the disclosure.

The first output-side control module and the second output-side control module may share steering control information to control the steering motor based on any one of the first steering control information or the second control information. The first output-side control module may receive any one of the first steering control information or the second steering control information from any one of the first input-side control module or the second input-side control module. Thereafter, the first output-side control module may transmit any one of the first steering control information or the second steering control information to the second output-side control module through a communication channel connecting between the first output-side control module and the second output-side control module. Similarly, the second output-side control module may receive any one of the first steering control information or the second steering control information from any one of the first input-side control module or the second input-side control module. Thereafter, the second output-side control module may transmit any one of the first steering control information or the second steering control information to the first output-side control module through the communication channel connecting between the first output-side control module and the second output-side control module.

Here, the communication channel may be a transmission and/or reception path for the steering control information, and may include, for example, but not limited to, a control area network (CAN), which is a common communication channel for a vehicle capable of communicating with modules mounted on or included in a vehicle, an inter micro CAN (IMC) or a private CAN (control area network) connected between two control modules.

The first output-side control module may share the first steering control information with the second output-side control module after receiving the first steering control information through an internal communication channel from the first input-side control module. Further, when the first input-side control module does not operate normally or operates in an abnormal state, the second output-side control module may receive the second steering control information from the second input-side control module through the internal communication channel, and then share the second steering control information with the first output-side control module. Accordingly, even when abnormality such as a failure or fault occurs in any one of the first input-side control module or the second input-side module, the steering control device may normally control the steering motor by sharing the steering control information through the communication channels.

For example, when abnormality such as a failure or failure occurs in the first input-side control module, the second output-side control module may receive the second steering control information from the second input-side control module through the internal communication channel and share the second steering control information with the first output-side control module. The first output-side control module and the second output-side control module may normally control the steering motor based on the second steering control information.

As another example, when abnormality such as a failure or fault occurs in the second input-side control module, the first output-side control module may receive the first steering control information from the first input-side control module through the internal communication channel and share the first steering control information with the second output-side control module. The first output-side control module and the second output-side control module may normally control the steering motor based on the first steering control information.

Further, the steering control device may control the steering motor at a performance up to 50% even when abnormality such as a failure or fault occurs in any one of the first output-side control module or the second output-side control module.

Here, the steering motor may be, for example, but not limited to, a dual winding motor. In this case, the first output-side control module and the second output-side control module each may control the steering motor at a performance up to 50%.

For example, when abnormality such as a failure or fault occurs in the first output-side control module, the second output-side control module may receive the second steering control information from the second input-side control module through the internal communication channel and control the steering motor at a performance up to 50%. Similarly, when abnormality such as a failure or fault occurs in the second output-side control module, the first output-side control module may receive the first steering control information from the first input-side control module through the internal communication channel to control the steering motor at a performance up to 50%.

As another example, when abnormality such as a failure or fault occurs in the first steering control device (e.g. the first input-side control module and the first output-side control module), the second output-side control module may receive the second steering control information from the second input-side control module through the internal communication channel to control the steering motor at a performance up to 50%. Similarly, when abnormality such as a failure or fault occurs in the second steering control device (e.g. the second input-side control module and the second output-side control module), the first output-side control module may receive the first steering control information from the second input-side control module through the internal communication channel to control the steering motor at a performance up to 50%.

As another example, when abnormality such as a failure or fault occurs in the second input-side control module and the first output-side control module, the second output-side control module may receive the first steering control information from the first input-side control module and then control the steering motor based on the first steering control information.

As another example, when abnormality such as a failure or fault occurs in the first input-side control module and the second output-side control module, the first output-side control module may receive the second steering control information from the second input-side control module and then control the steering motor based on the second steering control information.

Likewise, the first output-side control module and the second output-side control module may be configured to be redundant. In this case, the first output-side control module and the second output-side control module may be configured in a master-slave relationship to control the steering motor based on the steering control information. However, this is merely an example, and the present disclosure is not limited thereto. The relationship between the first output-side control module and the second output-side control module may be variously configured as necessary, unless it contradicts the technical spirit of the disclosure.

The exemplary embodiment of FIG. 14 illustrates that step S1420 is performed after step S1410, but this is for convenience of description, and the present disclosure is not limited thereto. Steps S1410 and S1420 may be performed regardless of the order (for example, step S1410 is performed after step S1420) or may be performed simultaneously.

Referring back to FIG. 14, the first output-side control module and the second output-side control module may receive and share at least one of the first steering control information or the second steering control information, and control the steering motor based on the shared steering control information (step S1430).

For example, the first input-side control module and the second input-side control module may be connected to the first output-side control module and the second output-side control module through an internal communication channel.

The first input-side control module may transmit the first steering control information to the first output-side control module and/or the second output-side control module through the internal communication channel. The second input-side control module may transmit the second steering control information to the first output-side control module and/or the second output-side control module through the internal communication channel.

In other words, when abnormality such as a failure or fault occurs in the second input-side control module and the first output-side control module, the second output-side control module may receive the first steering control information from the first input-side control module through the internal communication channel to control the steering motor. Further, when abnormality such as a failure or fault occurs in the first input-side control module and the second output-side control module, the first output-side control module may receive the second steering control information from the second input-side control module through the internal communication channel to control the steering motor.

As another example, the first input-side control module, the second input-side control module, the first output-side control module, and the second output-side control module may be connected by one integrated internal communication channel.

The first input-side control module may transmit the first steering control information to the first output-side control module and the second output-side control module through the internal communication channel. The second input-side control module may transmit the second steering control information to the first output-side control module and the second output-side control module through the internal communication channel.

In other words, when abnormality such as a failure or fault occurs in the second input-side control module and the first output-side control module, the second output-side control module may receive the first steering control information from the first input-side control module through the internal communication channel to control the steering motor. Further, when abnormality such as a failure or fault occurs in the first input-side control module and the second output-side control module, the first output-side control module may receive the second steering control information from the second input-side control module through the internal communication channel to control the steering motor.

For instance, the internal communication channel may be an integrated CAN BUS that connects the first input-side control module, the second input-side control module, the first output-side control module, and the second output-side control module into one integrated communication channel. Here, the CAN BUS may communicate using one of an optical fiber or a twisted two-wire medium. In this case, the transmission of the signal in the internal communication channel may be configured such that the signal transmission from the first input-side control module and the signal transmission from the second input-side control module are temporally divided and performed, like the time division duplex method. For example, during signal transmission by the first input-side control module, signal transmission by the second input-side control module may be withheld or may not be performed. And, while the signal transmission through the internal communication channel is performed by the second input-side control module, the signal transmission through the internal communication channel by the first input-side control module may not be performed.

In other words, when abnormality such as a failure or fault occurs in the second input-side control module and the first output-side control module, the second output-side control module may receive the first steering control information from the first input-side control module through one integrated internal communication channel to control the steering motor. Further, when abnormality such as a failure or fault occurs in the first input-side control module and the second output-side control module, the first output-side control module may receive the second steering control information from the second input-side control module through one integrated internal communication channel to control the steering motor.

As another example, the first output-side control module and the second output-side control module may receive the first steering control information and the second steering control information through a common communication channel.

The first input-side control module may transmit the first steering control information to the first output-side control module through an internal communication channel. The second input-side control module may transmit the second steering control information to the second output-side control module through an internal communication channel.

When abnormality such as a failure or fault occurs in the second input-side control module and the first output-side control module, the second output-side control module may receive the first steering control information from the first input-side control module through the common communication channel to control the steering motor. Further, when abnormality such as a failure or fault occurs in the first input-side control module and the second output-side control module, the first output-side control module may receive the second steering control information from the second input-side control module through the common communication channel to control the steering motor.

As another example, the first input-side control module may be connected to the second output-side control module through an internal communication channel, and the second input-side control module may be connected to the first output-side control module through an internal communication channel.

The first input-side control module may transmit the first steering control information to the second output-side control module through an internal communication channel. Thereafter, the second output-side control module may share the first steering control information with the first output-side control module.

Further, the second input-side control module may transmit the second steering control information to the first output-side control module through an internal communication channel. Thereafter, the first output-side control module may share the first steering control information with the second output-side control module.

Further, the first input-side control module may be connected to the second output-side control module through an internal communication channel, and the second input-side control module may be connected to the first output-side control module through an internal communication channel.

In other words, the second output-side control module may receive the first steering control information from the first input-side control module through the internal communication channel and share the first steering control information with the first output-side control module to control the steering motor. Further, when abnormality such as a failure or fault occurs in the first input-side control module, the first output-side control module may receive the second steering control information from the second input-side control module through an internal communication channel and share the second steering control information with the second output-side control module to control the steering motor.

Further, the first output-side control module and the second output-side control module may transmit and receive steering information through a common communication channel.

Even when abnormality such as a failure or fault occurs in the first steering control device (e.g. the first input-side control module and the first output-side control module), the second output-side control module may receive the second steering control information from the second input-side control module through the common communication channel to control the steering motor. Further, even when abnormality such as a failure or fault occurs in the second steering control device (e.g. the second input-side control module and the second output-side control module), the first output-side control module may receive the first steering control information from the first input-side control module through the common communication channel to control the steering motor.

Therefore, according to some embodiments of the present disclosure, a steering control method for safe driving may control steering by sharing steering control information through a communication channel between control modules even when abnormality such as a failure or fault occurs in one or more control modules.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A system for controlling a steering motor, the system comprising:
   a first steering control device including a first input-side control module configured to generate first steering control information and a first output-side control module configured to control the steering motor; and
   a second steering control device including a second input-side control module configured to generate second steering control information and a second output-side control module configured to control the steering motor,
   wherein:
   the first output-side control module and the second output-side control module are configured to share at least one of the first steering control information or the second steering control information with each other,
   the second output-side control module is configured to, when the second input-side control module and the first output-side control module are determined to be in an abnormal state while the first input-side control module is determined to be in a normal state, control the steering motor based on the first steering control information generated by the first input-side control module of the first steering control device, and the first output-side control module of the first steering control device is configured to, when the first input-side control module and the second output-side control module are determined to be in the abnormal state while the second input-side control module is determined to be in the normal state, control the steering motor based on the second steering control information generated by the second input-side control module of the second steering control device.

2. The system of claim 1, wherein:

the first output-side control module is configured to receive the first steering control information from the first input-side control module through an internal communication channel and share the first steering control information with the second output-side control module, and the second output-side control module is configured to, when the first input-side control module is in the abnormal state, receive the second steering control information from the second input-side control module through the internal communication channel and share the second steering control information with the first output-side control module.

3. The system of claim 2, wherein the second output-side control module is configured to, when the second input-side control module and the first output-side control module are in the abnormal state, receive the first steering control information from the first input-side control module through the internal communication channel.

4. The system of claim 2, wherein the first output-side control module is configured to, when the first input-side control module and the second output-side control module are in the abnormal state, receive the second steering control information from the second input-side control module through the internal communication channel.

5. The system of claim 1, wherein the system further comprises an internal communication channel that directly connects all of the first input-side control module, the second input-side control module, the first output-side control module, and the second output-side control module to one another such that any one of the first input-side control module, the second input-side control module, the first output-side control module, and the second output-side control module can directly transmit data to any other ones of the first input-side control module, the second input-side control module, the first output-side control module, and the second output-side control module.

6. The system of claim 2, wherein the second output-side control module is configured to, when the second input-side control module and the first output-side control module are in the abnormal state, receive the first steering control information from the first input-side control module through a common communication channel.

7. The system of claim 2, wherein the first output-side control module is configured to, when the first input-side control module and the second output-side control module are in the abnormal state, receive the second steering control information from the second input-side control module through a common communication channel.

8. The system of claim 1, wherein:

the second output-side control module is configured to receive the first steering control information from the first input-side control module through an internal communication channel and share the first steering control information with the first output-side control module, and the first output-side control module is configured to, when the first input-side control module is in the abnormal state, receive the second steering control information from the second input-side control module through an internal communication channel and share the second steering control information with the second output-side control module.

9. The system of claim 8, wherein the second output-side control module is configured to, when the first input-side control module and the first output-side control module are in the abnormal state, receive the second steering control information from the second input-side control module through a common communication channel.

10. The system of claim 8, wherein the first output-side control module is configured to, when the second input-side control module and the second output-side control module are in the abnormal state, receive the first steering control information from the first input-side control module through a common communication channel.

11. The system of claim 1, wherein a respective one of the first input-side control module, the first output-side control module, the second input-side control module, and the second output-side control module is determined to be in the abnormal state when it is determined in a first situation that a direct fault or failure of the respective one of the first input-side control module, the first output-side control module, the second input-side control module, and the second output-side control module has occurred.

12. The system of claim 11, wherein the respective one of the first input-side control module, the first output-side control module, the second input-side control module, and the second output-side control module is further determined to be in the abnormal state when it is determined in a second situation that an indirect direct fault or failure of the respective one of the first input-side control module, the first output-side control module, the second input-side control module, and the second output-side control module has occurred.

13. A method for controlling a steering motor, the method comprising:

generating first steering control information by a first input-side control module included in a first steering control device;

generating second steering control information by a second input-side control module included in a second steering control device;

sharing at least one of the first steering control information or the second steering control information by a first output-side control module included in the first steering control device and a second output-side control module included in the second steering control device; and controlling the steering motor by the first output-side control module and/or the second output-side control module, wherein the controlling of the steering motor includes:

when the second input-side control module and the first output-side control module are determined to be in an abnormal state while the first input-side control module is determined to be in a normal state, controlling the steering motor using the second output-side control module using the first steering control information generated by the first input-side control module; and when the first input-side control module and the second output-side control module are determined to be in the abnormal state while the second input-side control module is determined to be in the normal state, controlling the steering motor using the first output-side control module using the second steering control information generated by the second input-side control module.

14. The method of claim 13, further comprising:

by the first output-side control module, receiving the first steering control information through an internal communication channel from the first input-side control module and sharing the first steering control information with the second output-side control module, and when the first input-side control module is in the abnormal state, receiving, by the second output-side control module, the second steering through control information an internal communication channel from the second input-side control module and sharing, by the second output-side control module, the second steering control information with the first output-side control module.

15. The method of claim 14, further comprising, when the second input-side control module and the first output-side control module are in the abnormal state, receiving, by the second output-side control module, the first steering control information from the first input-side control module through the internal communication channel.

16. The method of claim 14, wherein further comprising, when the first input-side control module and the second output-side control module are in the abnormal state, receiving, by the first output-side control module, the second steering control information from the second input-side control module through the internal communication channel.

17. The method of claim 15, wherein the internal communication channel connects the first input-side control module, the second input-side control module, the first output-side control module, and the second output-side control module.

18. The method of claim 14, further comprising, when the second input-side control module and the first output-side control module are in the abnormal state, receiving, by the second output-side control module, the first steering control information from the first input-side control module through a common communication channel.

19. The method of claim 14, further comprising, when the first input-side control module and the second output-side control module are in the abnormal state, receiving, by the first output-side control module, the second steering control information from the second input-side control module through a common communication channel.

20. The method of claim 13, further comprising:

by the second output-side control module, receiving the first steering control information from the first input-side control module through an internal communication channel and sharing the first steering control information with the first output-side control module; and when the first input-side control module is in the abnormal state, receiving, by the first output-side control module, the second steering control information through an internal communication channel from the second input-side control module and sharing, by the first output-side control module, the second steering control information with the second output-side control module.

* * * * *